Nov. 8, 1938.   H. R. DARLING ET AL   2,136,357
CARRYING CASE
Filed May 7, 1937
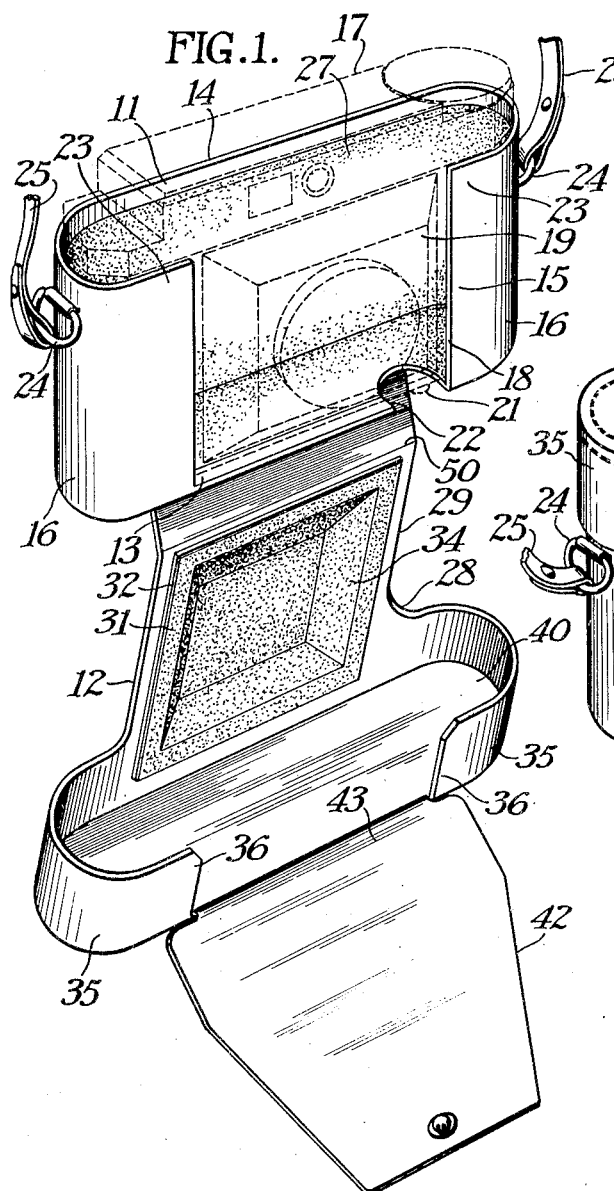
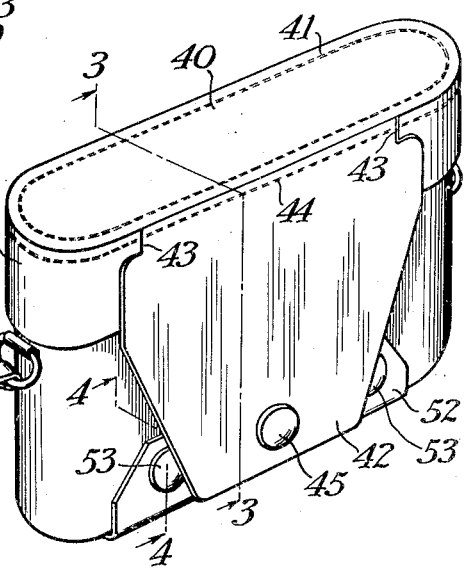
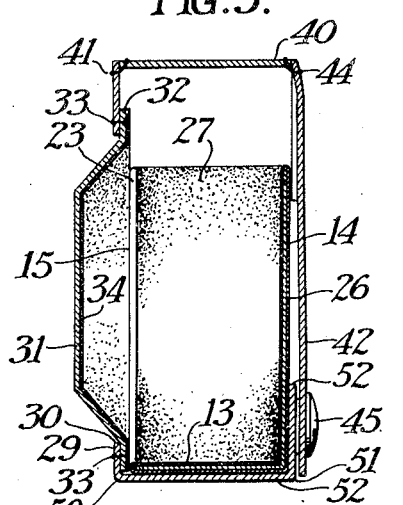
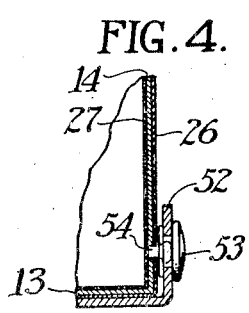
Harry R. Darling
Newton B. Green
INVENTORS
BY
ATTORNEYS.

Patented Nov. 8, 1938

2,136,357

UNITED STATES PATENT OFFICE 2,136,357

CARRYING CASE

Harry R. Darling and Newton B. Green, Rochester, N. Y., assignors to Eastman Kodak Company, Rochester, N. Y., a corporation of New Jersey Application May 7, 1937, Serial No. 141,324

1 Claim. (Cl. 95—31)

The present invention relates to carrying cases for folding cameras, and it has as one of its objects the provision of such a case which is so constructed that the camera may be used without removing it from the case.

Another object of the invention is the provision of a case of this class which may be folded to completely enclose and protect the camera, yet may be readily unfolded to permit the camera to be used.

Still another object of the invention is the provision of a case of the class described which is formed to provide a camera supporting member or frame in which the camera is positioned and supported, and which permits full use of the camera without the removal of the latter, and an enclosing member which may be wrapped around and detachably secured to the frame. When the camera is to be used this member may be unwrapped to expose the camera parts, or may be completely detached therefrom.

A further object of the invention is the provision of such a case which is simple in construction, relatively inexpensive to manufacture, and highly effective in use.

To these and other ends, the invention resides in certain improvements and combinations of parts all as will be hereinafter more fully described, the novel features being pointed out in the claim at the end of the specification.

Fig. 1 is a perspective view of a carrying case constructed in accordance with the present invention, showing the outer closure member unfolded to permit complete use of the camera.

Fig. 2 is a perspective view taken from the rear of the carrying case illustrated in Fig. 1, with the outer closure member in folded position to enclose and protect the camera, and showing the arrangement whereby the outer closure member is detachably secured to the inner camera supporting frame.

Fig. 3 is a vertical sectional view taken substantially on the line 3—3 of Fig. 2 showing the arrangement of the various parts of a carrying case constructed in accordance with the present invention.

Fig. 4 is a fragmentary sectional view taken substantially on the line 4—4 of Fig. 2, showing, in detail, the method of detachably securing the outer closure member to the inner camera supporting member or frame.

Similar reference numerals throughout the several views indicate the same parts.

The carrying case illustrated in the present embodiment of the invention is primarily designed for use in connection with folding cameras of the "Retina" type. It is contemplated, however, that the structural arrangement of such a case may be varied to suit other types of folding cameras without departing from the spirit of the invention or the scope of the appended claim.

In its broadest aspect, the carrying case covered by the present invention comprises an inner substantially rigid supporting member or frame, preferably of leather covered metal, in which the camera is positioned and carried. This frame not only adequately supports the camera, but also permits the free and complete use thereof without necessitating the removal of the camera therefrom. The frame is enclosed in an outer casing or closure member of heavy leather which is wrapped around and detachably secured to the back of the supporting member or frame, thus completely enclosing and protecting the camera when not in use. When, however, the camera is to be used, one end of this closure member may be detached and the member unfolded, see Fig. 1, to expose the working parts of the camera, or the member may be completely detached and removed from the camera supporting member, if desired.

Referring now to the drawing wherein is shown a carrying case adapted for use with a folding camera of the "Retina" type. This carrying case comprises, in general, an inner camera supporting member or frame to which is detachably secured the outer closure member or wrapper. These members are generally indicated by the numerals 11 and 12 respectively.

The inner frame 11 is made of a substantially rigid material, preferably sheet metal, which is pressed, drawn, or otherwise formed to provide a bottom 13, a back wall 14, a front wall 15, and curved ends 16 connecting the front and back walls, all of which are clearly illustrated in Fig. 1. The top of the frame is left open so that a camera 17, shown dotted in Fig. 1, may be inserted into and removed from the frame 11 through the open top. The front wall 15 has the central portion thereof cut away to provide an opening 18 through which the folding bed 19 of the camera 17 may project. The opening of the camera bed is controlled by a plunger 21 which is accessible through an opening 22 formed in the bottom 13, as clearly shown in Fig. 1.

The front wall 15 of the frame 11 is so spaced from the back wall 14 that the camera 17 will snugly fit therebetween. The upper unsupported portions 23 of the front wall 15, being metal, afford slightly resilient members or portions which lightly press against the camera front and thus assist in retaining the camera 17 in position in the frame 11. The ends 16 have secured thereto, in any suitable and well known manner, rings 24 to which a carrying strap or sling 25 is attached.

This frame 11 thus provides an adequate support for the camera 17, and permits free and complete use thereof without necessitating the removal of the camera from the frame. Between exposures, the frame 11 may be slung from the neck by means of the strap 25. The outer surface of the frame 11 may be covered with leather, as indicated at 26, and the inner surface thereof may be lined with a suitable plush or other material 27, all of which are clearly indicated in Fig. 3.

When the camera is not in use, the frame 11 and camera 17 are preferably enclosed in a suitable protective covering or casing. This covering comprises, in the present embodiment, a heavy leather strip which is wrapped around the frame 11 and detachably secured thereto in the manner shown in Fig. 2 and to be presently described. This closure member comprises a T-shaped piece of heavy sole leather, generally indicated by the member 28, having a central portion 29 which is arranged to override the front wall 15 of the frame 11. In order to provide for the projected camera bed 19, the portion 29 is provided with an opening 30 through which the bed 19 may project. A cup-shaped member 31, of the shape best shown in Fig. 3, closes the opening 30 and overlies the bed 19. The marginal edges 32 of the member 31 are secured to the inner surface of the portion 29 by rows of stitching 33. The inner surface of the member 31 may be covered with plush or other soft material, as shown at 34, Fig. 3, to protect the front face of the camera bed 19.

The lower arms 35 of the T-shaped member 28, as viewed in Fig. 1, are curved toward each other to conform to the shape of the frame 11, and preferably, although not necessarily, have the ends 36 thereof spaced apart as clearly shown in Fig. 1. A top piece 40 is inserted within the curved arm 35 and engages the inner surface thereof, as shown in Fig. 3. This top piece is arranged to overlie the camera 17 and to close the top of the frame 11. Rows of diagonal stitching 41 secure the piece 40 to the curved arm 35, as clearly illustrated in Figs. 2 and 3. A flap 42, of the shape best shown in Figs. 1 and 2, overlies the back wall 14, and has a part 43 thereof arranged to lie between the ends 36 of the curved arms 35 and to engage the rear edge of the top piece 40. The flap 42 is hingedly connected to the top piece 40 by means of the rows of diagonal stitching 44. The lower end of the flap 42 is provided with a snap button 45 which is adapted to engage a cooperating member, hereinafter described, to detachably secure the flap 42 to the back 14.

The upper portion of the leg of the T-shaped member, as viewed in Fig. 1, is scored along the parallel lines 50 and 51, see Fig. 3, to provide a member or flap 52 which overlies the bottom 13 and extends upwardly along the back wall 14 and under the flap 42, as clearly illustrated in Figs. 2 and 3. The free end of the flap 52 is provided with a snap button 53 which engages the cooperating stud 54, see Fig. 4, attached to the back 14 whereby the flap 52 may be detachably secured to the back 14. Flap 52 is also provided with a stud, similar to the stud 54, which cooperates with the snap button 45 to detachably secure the flap 42 to the flap 52. As the flap 42 is detachably secured to the flap 52 and the latter is, in turn, detachably secured to the back 14, flap 42 may be broadly considered as also detachably secured to the back 14. In fact, it is contemplated that the flap 42 may be detachably secured to the back wall 14 independently of the flap 52, if so desired.

When the camera is to be used the snap button 45 is released, and the closure member or outer casing 12 is swung in a counter-clockwise direction, as viewed in Fig. 2, until the portion 29 and the flap 52 are substantially in alignment. The various members are then in the position shown in Fig. 1, and the camera may be used without necessitating the removal of the camera from the frame 11. If more convenient, the closure member may be completely detached from the frame 11 by unsnapping the buttons 53. Between exposures, the camera may be slung from the strap 25 much in the manner of binoculars. The closure member 12 may be replaced merely by snapping the buttons 53 onto the studs 54, wrapping the closure member clockwise, as viewed in Fig. 2, to bring the members into the position shown in Fig. 2, and then snapping the button 45 to secure the flap 42 to the flap 52. The camera 17 is now completely closed and protected.

It is thus apparent from the above description that the present invention provides a carrying case which permits free use of the camera without necessitating the removal of the camera from the case. It is also apparent that when the case is in folded position, the camera is completely enclosed and adequately protected, yet the case may be readily and easily unfolded to afford instant use of the camera.

While one embodiment of the invention has been disclosed, it is to be understood that the inventive idea may be carried out in a number of ways. This application, is therefore, not to be limited to the precise details described, for it is intended to cover all variations and modifications thereof falling within the spirit of the invention and the scope of the appended claim.

What we claim is:

A camera carrying case comprising, in combination, a leather-covered metal camera supporting frame comprising a bottom, ends, front and back walls, the top of said frame being open to permit the insertion or removal of a camera through said top, said front wall having a part thereof cut away to allow the camera bed to be opened and closed, resilient portions on said front wall adapted to engage said camera to yieldably retain the latter in position within said frame, a one piece closure member having parts arranged to overlie and close said top and said front wall, a flap hinged to one end of said member and overlying said bottom and having the end thereof detachably secured to said back wall, and a second flap secured to the opposite end of said member and overlying said back wall and said first mentioned flap and detachably secured to the latter, said member being unfoldable upon release of said flap to permit said camera to be used while held in said frame.

HARRY R. DARLING.
NEWTON B. GREEN.